United States Patent
Kumar et al.

(10) Patent No.: US 7,219,130 B2
(45) Date of Patent: May 15, 2007

(54) SYSTEM AND METHOD FOR INTEGRATING E-MAIL INTO FUNCTIONALITY OF SOFTWARE APPLICATION

(75) Inventors: Ankesh Kumar, Hillsborough, CA (US); Timothy J. Canniffe, Millbrae, CA (US); Martin Logan, San Francisco, CA (US); Thomas B. Bennett, Tujunga, CA (US)

(73) Assignee: Appmail LLC, Burlingame, CA (US)

( * ) Notice: Subject to any disclaimer, the term of this patent is extended or adjusted under 35 U.S.C. 154(b) by 727 days.

(21) Appl. No.: 10/307,188

(22) Filed: Nov. 29, 2002

(65) Prior Publication Data

US 2003/0149730 A1  Aug. 7, 2003

Related U.S. Application Data

(60) Provisional application No. 60/333,705, filed on Nov. 28, 2001.

(51) Int. Cl.
*G06F 15/16* (2006.01)
(52) U.S. Cl. .................. 709/206; 709/203; 709/205; 709/217
(58) Field of Classification Search ............ 709/203, 709/205–206, 217, 219, 223, 224
See application file for complete search history.

(56) References Cited

U.S. PATENT DOCUMENTS

| | | | |
|---|---|---|---|
| 6,226,670 B1 * | 5/2001 | Ueno et al. ............ 709/207 |
| 6,247,045 B1 * | 6/2001 | Shaw et al. ............ 709/207 |
| 6,453,337 B2 | 9/2002 | Miller et al. | |
| 6,457,045 B1 | 9/2002 | Hanson et al. | |
| 6,463,461 B1 | 10/2002 | Hanson et al. | |
| 6,484,196 B1 * | 11/2002 | Maurille ............ 709/206 |
| 6,496,849 B1 | 12/2002 | Hanson et al. | |
| 6,505,233 B1 | 1/2003 | Hanson et al. | |
| 6,507,865 B1 | 1/2003 | Hanson et al. | |
| 6,523,063 B1 | 2/2003 | Miller et al. | |
| 6,691,153 B1 * | 2/2004 | Hanson et al. ........... 709/204 |
| 2002/0138582 A1 * | 9/2002 | Chandra et al. ......... 709/206 |

* cited by examiner

*Primary Examiner*—Ario Etienne
*Assistant Examiner*—LaShonda Jacobs
(74) *Attorney, Agent, or Firm*—Fay Sharpe LLP

(57) ABSTRACT

A method for interacting with an underlying program using e-mail includes receiving an APPMAIL request from a user (or automated process) of an underlying program. The APPMAIL request defines a task requiring input from one or more recipients. An APPMAIL is generated based upon the request. The APPMAIL includes a body providing information concerning the task and at least one structured input portion. The structured input portion includes at least one structured input field for receiving pre-defined structured input from the recipient(s). The APPMAIL can also include an unstructured input portion for receiving unstructured input data from the recipient(s). The APPMAIL is sent to the recipient(s) via e-mail and completed APPMAILs are received from the recipient(s) via http(s) post or e-mail. Each completed APPMAIL comprises structured input data entered by the recipient in the at least one structured input field. The structured input data is extracted from the structured input field. The extracted structured input data are stored for use by the underlying program. Any unstructured input data are extracted and stored.

18 Claims, 13 Drawing Sheets

From: Susan Manager [messenger@appmail.com
To: Demo2@wirss.com
Cc:
Subj: Req. Prod. Manager appmail http://www.appmail.com

Requisition Approval Request

Susan Manager has requested your feedback

Subject: requisition approval request
Requisition: Product Manager (TS1002)
Note: Need a software product manager with 5 years of experience managing programmers and software developers of all skill levels. Should be familiar with object oriented programming techniques as well as version control systems. College degree in computer science a plus.

Choose a response and click the "Send Now" button.

[Send Now]

⦿ I approve this requisition request
○ I do not approve
○ Problem
○ Other

Additional Comments:
No comment

FIG. 4

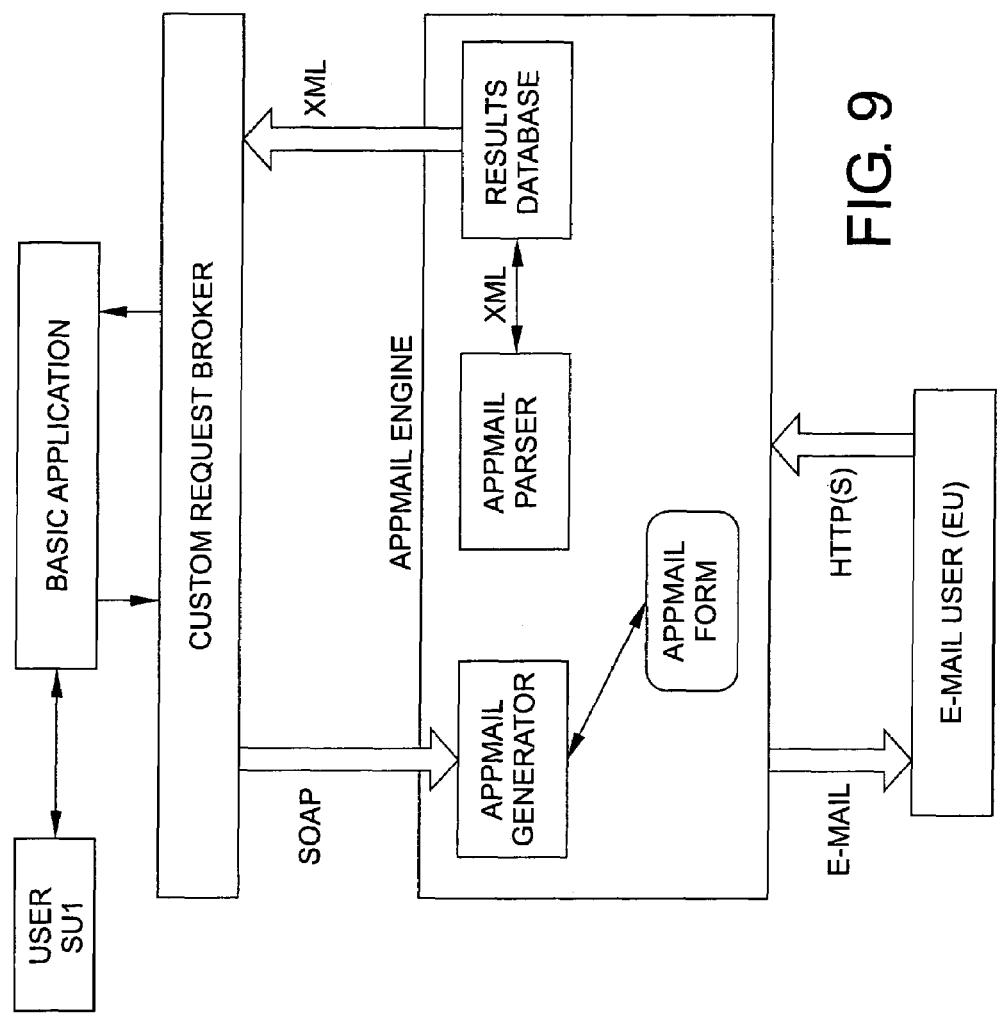

SYSTEM AND METHOD FOR INTEGRATING E-MAIL INTO FUNCTIONALITY OF SOFTWARE APPLICATION

CROSS-REFERENCRE TO RELATED APPLICATION

This application claims benefit of the filing date of and priority from U.S. provisional application No. 60/333,705 filed Nov. 28, 2001.

Background of the Invention

The present invention relates to a system and method for integrating e-mail into the functionality of a software application. In this manner, the present invention provides a system and method for collaboration among multiple computer users using a computer software application, wherein at least some of the computer users utilize only electronic mail (e-mail) to receive data from and submit data to the software application.

It is not intended that the system and method of the present invention be limited to any particular collaboration project or underlying basic software application. To facilitate an understanding of the present invention, however, the system and method are described herein with reference to collaboration among multiple computer users with respect to an underlying human resources basic computer software application. The invention is applicable to any other computer software application where input to the software application (and consequently the collaboration effort) is desired or required from one or more users that utilize only e-mail to receive output from and provide input to the software application.

The process of reviewing candidates for purposes of hiring one or more candidates to fulfill a requisition is one good example of a process that requires communication between and collaboration among multiple people. Heretofore, this has been accomplished by conventional means such as voice mail, meetings, e-mail, conventional paper memos and the like. Also, dedicated computer software applications are known where all people involved in the hiring process are required to learn and use dedicated human resource computer software applications to participate in the hiring process. These dedicated software applications are sub-optimal for many reasons, including the fact that the users must be trained to use the software application. It has proven difficult to train users given that many view their human resource tasks as being ancillary to their primary duties. These conventional dedicated software applications are also cumbersome in that they require every user to log in repeatedly by entering a username and password in order to participate in the collaboration effort.

It is widely known that e-mail is pervasive and used by nearly all corporate computer users. Also, e-mail is available to many computer users through mobile devices such as wireless telephones, wireless personal digital assistants and portable computers.

In light of the foregoing, a need has been recognized for a system and method for integrating e-mail into the functionality of a software application. This integration would allow mere e-mail users to receive output from and provide structured and unstructured input to a computer software application, such as a dedicated human resources computer software application.

SUMMARY OF THE INVENTION

In accordance with a first aspect of the present invention, a method for interacting with an underlying program using e-mail comprises receiving an APPMAIL request from a user (or automated process) of an underlying program. The request defines a task requiring input from one or more recipients. An APPMAIL is generated based upon the request. The APPMAIL includes a body providing information concerning the task and at least one structured input portion. The structured input portion includes at least one structured input field for receiving pre-defined structured input from the recipient(s). The APPMAIL is sent to the recipient(s) via e-mail and completed APPMAILs are received from the recipient(s) via http(s) post or e-mail. Each completed APPMAIL comprises structured input entered by the recipient in the at least one structured input field. The structured input is extracted from the structured input field. The extracted structured inputs are stored for use by said underlying program.

BRIEF DESCRIPTION OF THE DRAWINGS

The present invention comprises various systems and methods, preferred embodiments of which are illustrated in the accompanying drawings that form a part hereof and wherein:

FIG. 4 illustrates a specialized e-mail (referred to herein as an "APPMAIL"); generated in accordance with the present invention based upon the requisition approval process of FIG. 3 and including both structured input and unstructured input data fields for a user to receive output from and provide input to an underlying basic computer software application (referred to herein as an "APPMAIL");

FIG. 9 is a diagram that illustrates use of a custom request broker to interface the APPMAIL ENGINE with a third-party basic application.

DETAILED DESCRIPTION OF THE INVENTION

Figure 1:
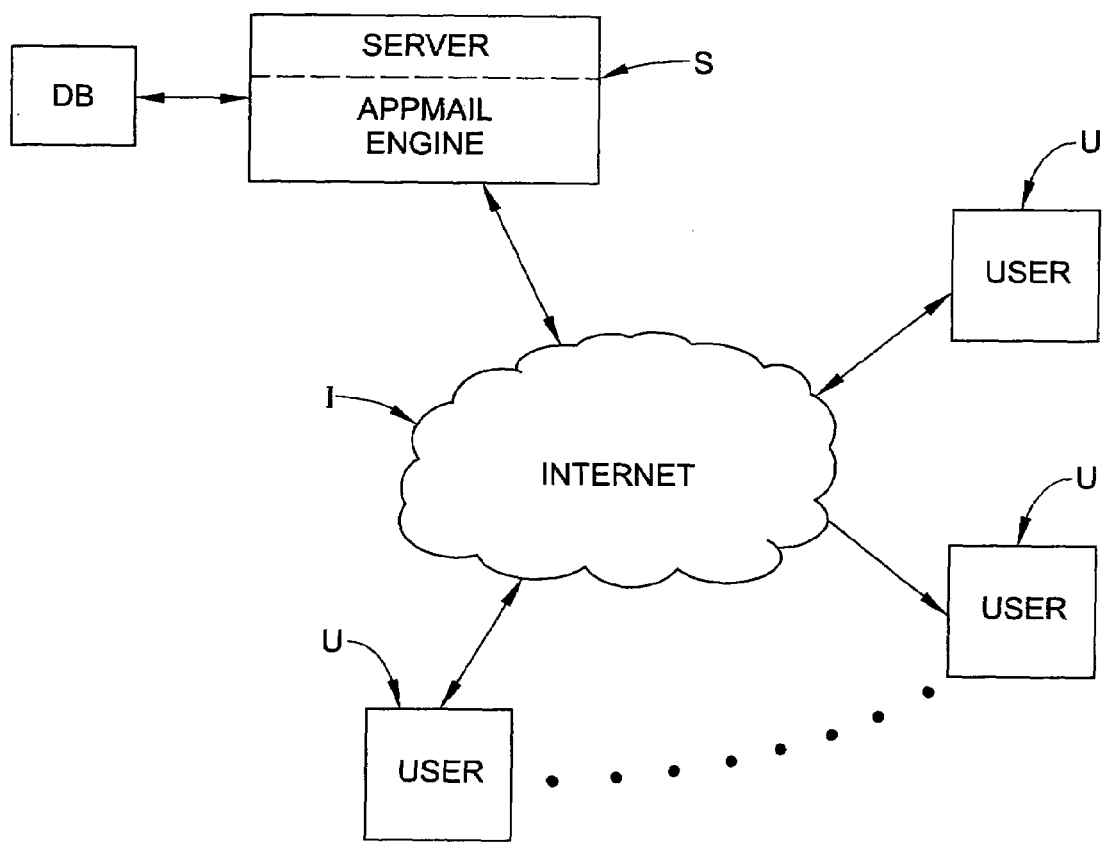
FIG. 1 is a diagrammatic illustration of a system formed in accordance with the present invention.

FIG. 1 diagrammatically illustrates a conventional web-based computer system for multiple user devices U to send data to and receive data from a server S via the internet I or another computer network. The user devices U can be connected to the internet or other network via wired or wireless connection. The server S comprises or is connected to database system DB that stores and allows authorized user devices U to obtain controlled/structured access to vast amounts of data as is also well-known in the art. The hardware and software for implementing a conventional web-based system, such as that shown in FIG. 1, are well known and are not explained further herein. In accordance with the present invention, however, the server S is programmed to implement a novel and unobvious computer software application, referred to herein as the APPMAIL ENGINE, that provides a system and method for integrating e-mail into the functionality of an underlying or "basic" software application running on the server S or elsewhere.

For purposes of understanding the system and method of the present invention, the invention is described with reference to a human resources candidate tracking software application incorporating the APPMAIL ENGINE. In this manner, the invention is described with reference to real-world examples that facilitate an understanding of the inventive concepts. The APPMAIL ENGINE can be used in any other software application (referred to herein as the "basic application" or "basic program") where multiple users are seeking to collaborate with each other to accomplish one or more tasks using the basic application, and it is not intended that the present invention be limited to the human resources candidate tracking system described herein.

In accordance with the present invention, the server S is running a basic application (the HR candidate tracking system in the present example) that incorporates the APP-MAIL ENGINE. The user devices U are each allowed a level of access with respect to the server S and basic application depending upon the authority assigned to the human user of those devices U. The human user of a user device U can be an e-mail user EU that interacts with the basic application only via e-mail only through the APP-MAIL ENGINE; a standard user SU that can access the server S and use basic application directly through a web browser or otherwise to control the basic application (and consequently the APPMAIL ENGINE); or an administrative user AU that has all the rights and privileges of a standard user SU, but can also add/delete standard users and also can access certain restricted, administrative portions of the basic application. As described hereinbelow, the system and method of the present invention allow the e-mail users EU to participate in the collaborative effort via the basic application, even through these e-mail users EU cannot directly access and use the basic application running on server S.

For ease of understanding the present invention, further reference to administrative users AU is not made. Instead, the following disclosure refers simply to a "user SU" to refer to either a standard user SU or an administrative user AU, because both of these users can directly access the server S and log in to the basic application to control same. As noted, e-mail users EU can interact with the server S and basic application only via specialized e-mail (APPMAIL) in accordance with the present invention.

Figure 2:
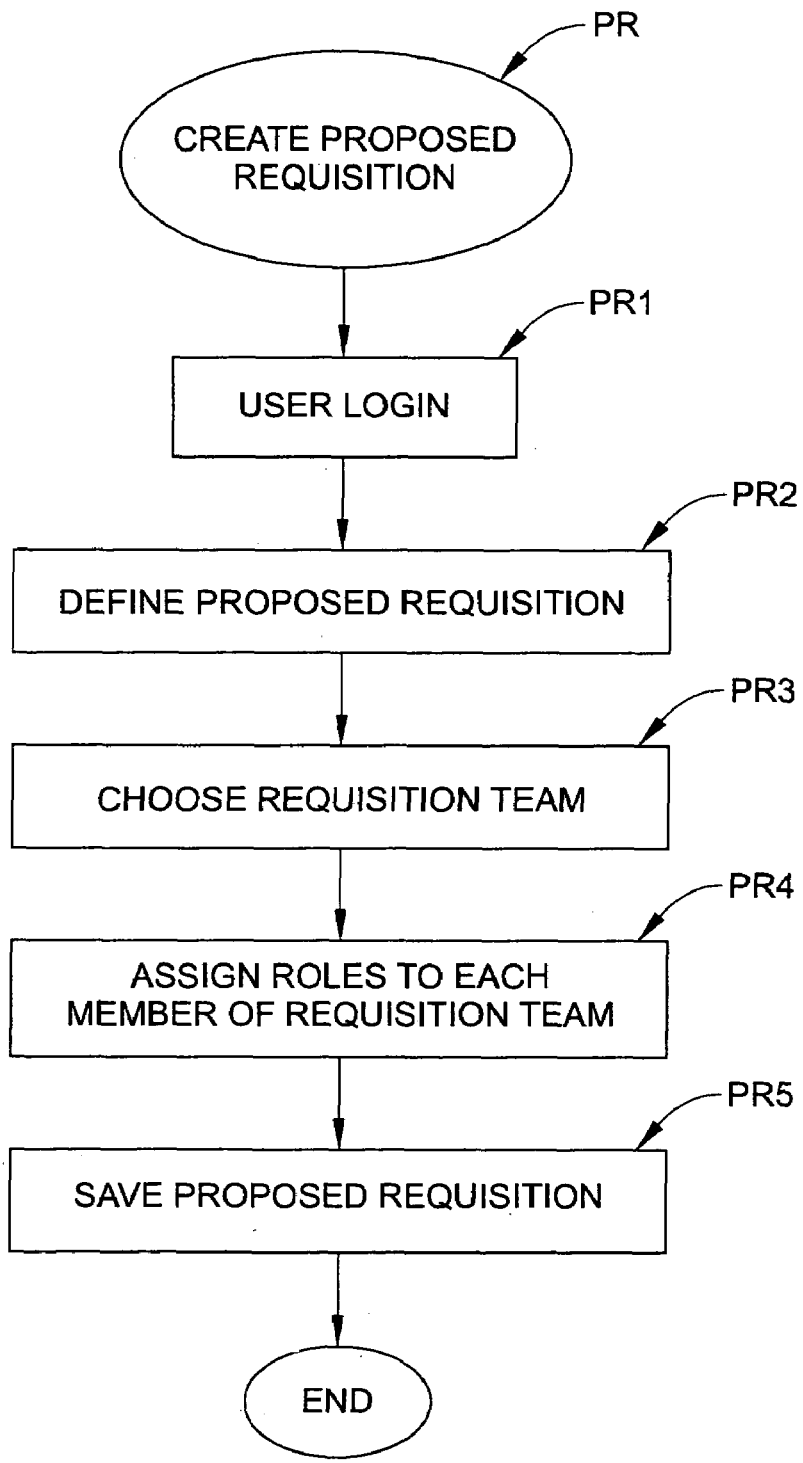
FIG. 2 is a flow chart that illustrates a process for creating a proposed requisition implemented in accordance with the present invention.

FIG. 2 is a flow chart that discloses a process PR for using a basic application (a web-based HR candidate tracking system application in the present example) to create a proposed requisition (description of a job opening to be filled by one or more candidates from a candidate database). The process PR comprises a user login step PR1 whereby a user SU logs in to the server S to use the basic application via web browser. The user SU defines a proposed requisition in step PR2 by inputting a job description and all other required information and chooses members of the requisition team in a step PR3. The requisition team member are either users SU and/or e-mail users EU (typically some of each) selected from a group of users SU,EU within an organization that must collaborate with each other to review and interview candidates from the candidate database and, ultimately, fill the job position defined by the requisition.

The process PR further comprises a step PR4 where the user SU creating the proposed requisition assigns one or more roles to each member of the requisition team. These roles provide important input to the APPMAIL ENGINE as described in full detail below. In the present example, each user member of the requisition team will have one or more roles selected from the following possible roles: requisition administrator, resume reviewer, interviewer, and/or requisition approver. A user SU with a "requisition administrator" role can interact directly with the server S and basic application via web browser to edit and otherwise alter/control the requisition (by definition an e-mail user EU cannot be assigned this role); a user SU,EU with a "resume reviewer" role will receive a specialized e-mail message configured in accordance with the present invention (referred to herein as an "APPMAIL") that provides the user SU,EU with candidate information for review and that also enables the user SU,EU to provide structured and unstructured response (feedback) data to other members of the requisition team concerning the information set forth in or attached to the APPMAIL; a user SU,EU with an "interviewer" role will be provided with an APPMAIL that provides information concerning a proposed interview schedule and that enables the user SU,EU to provide both structured and unstructured response (feedback) data to other members of the requisition team concerning the proposed interview schedule set forth in the APPMAIL; a user SU,EU with a "requisition approver" role will be provided with an APPMAIL that provides information concerning a proposed, newly created requisition and that enables the user SU,EU to provide both structured and unstructured response (feedback) data to other members of the requisition team concerning the proposed requisition as described in the APPMAIL.

In a step PR5, the proposed requisition is saved to a database or submitted directly for further processing as noted below. The process PR for creating a proposed requisition is preferably implemented via a web page including a graphical user interface, and the data defining the proposed requisition and all associated information are preferably defined in terms of HTML, XML or the like. It is important to note that the e-mail address for each user SU,EU must be known by or input to the basic application to allow for an APPMAIL to be sent to the user SU,EU via e-mail in accordance with the present invention.

Figure 3A:
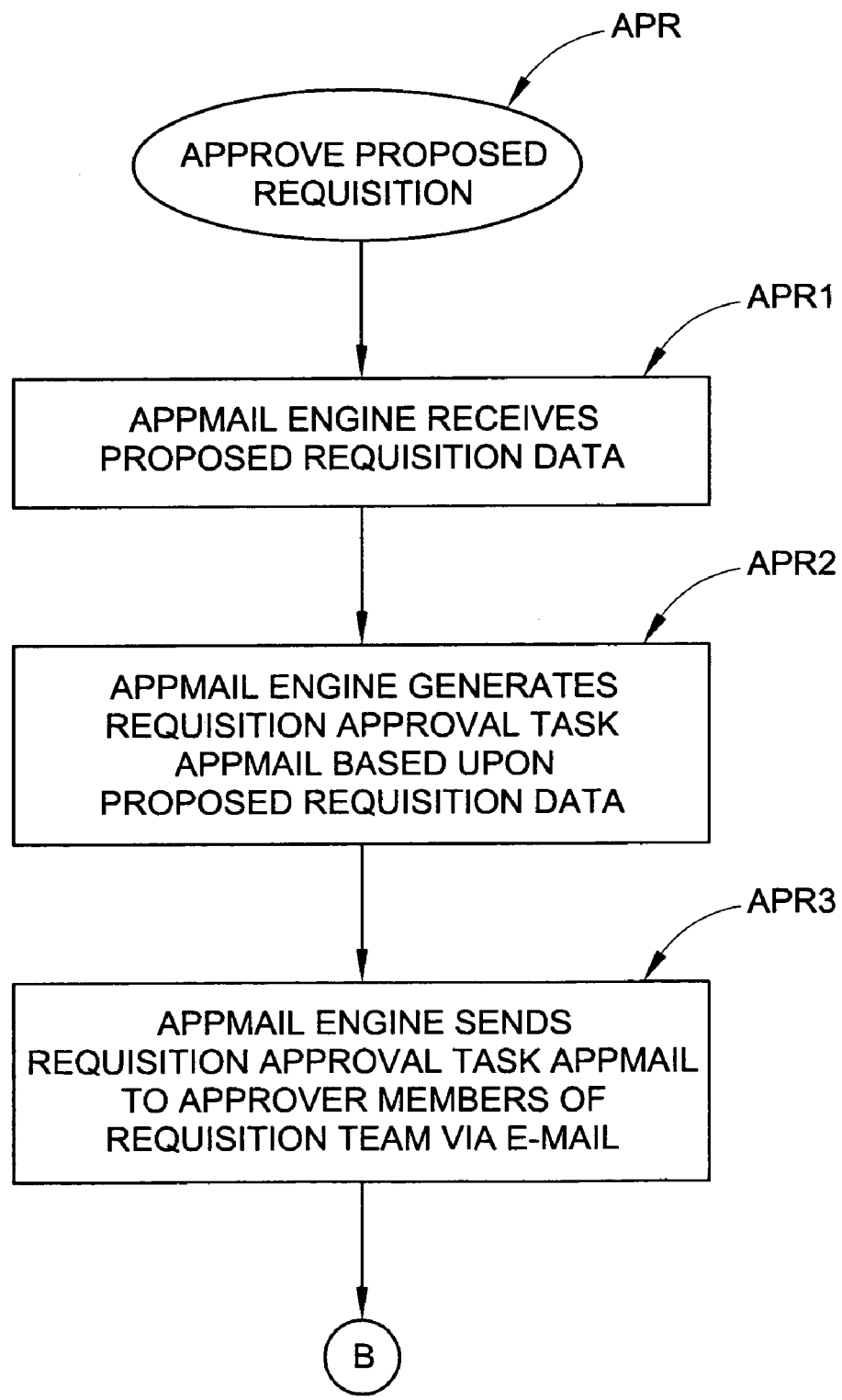
FIGS. 3A, 3B and 3C referred to collectively as FIG. 3, define a flow chart that illustrates a requisition approval process implemented in accordance with the present invention.
Figure 3B:
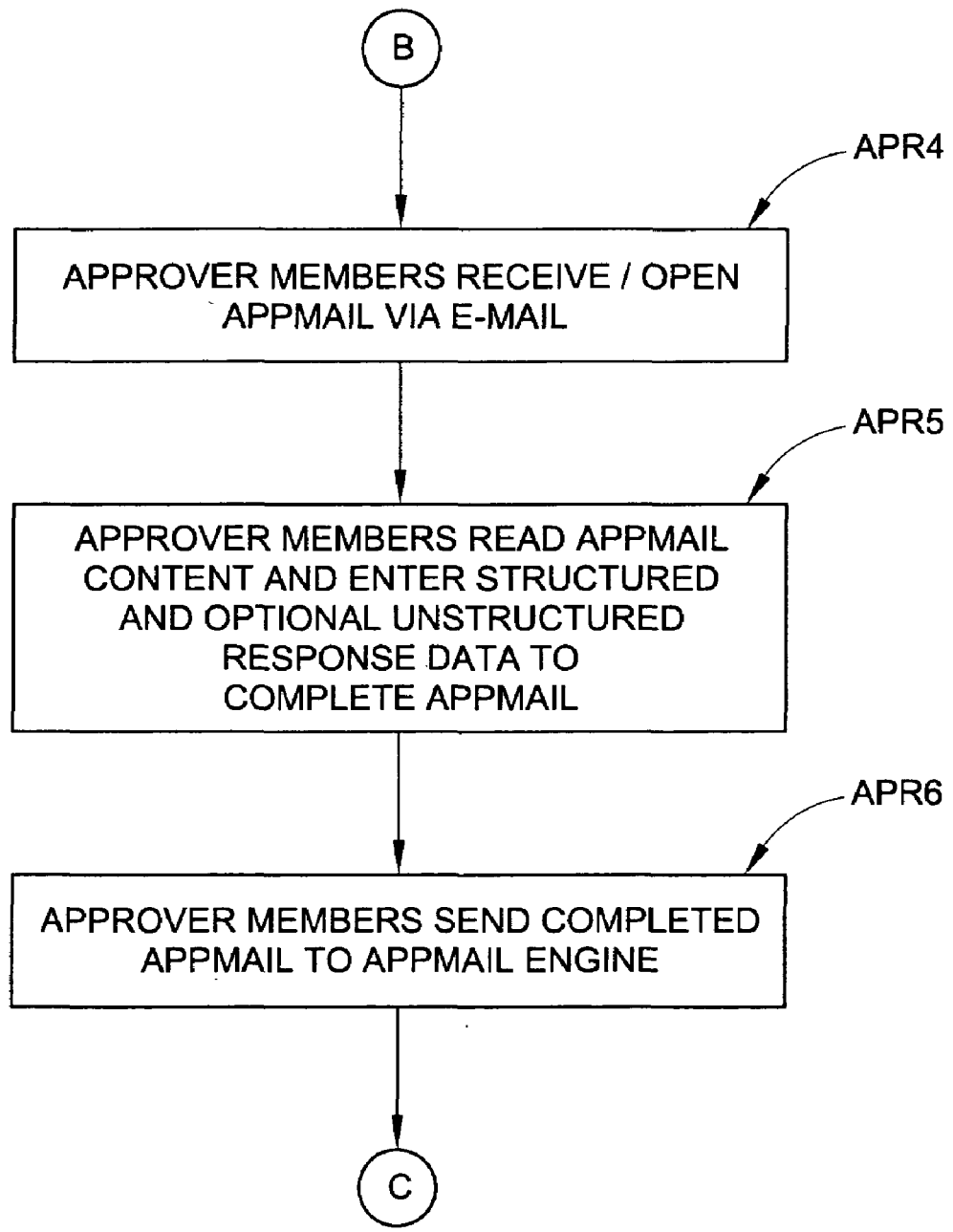
Figure 3C:
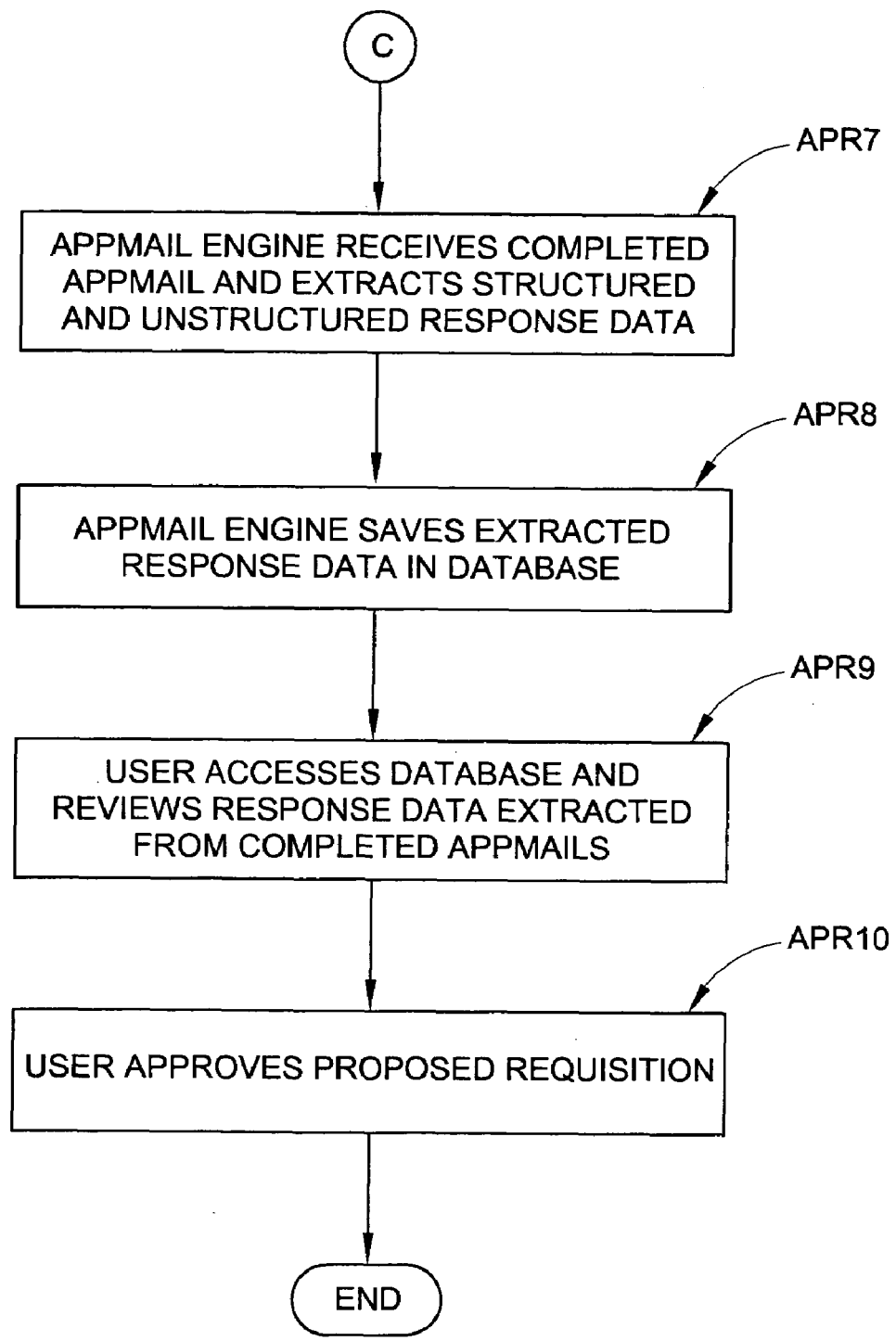

Upon the proposed requisition being saved, the APP-MAIL ENGINE is automatically invoked for an "Approve Proposed Requisition" process APR in accordance with the present invention as shown in FIGS. 3A–3C. The process APR comprises a first step APR1 wherein the APPMAIL ENGINE receives proposed requisition data. The proposed requisition data define the proposed requisition in terms of the job description and all other information entered by the creating user SU. In a second step APR2, the APPMAIL ENGINE generates or derives a Requisition Approval Task APPMAIL from the proposed requisition data. In a step APR3, the APPMAIL derived in step APR2 is sent via e-mail by the APPMAIL ENGINE and server S to the users SU,EU on the requisition team that have been assigned "requisition approver" roles.

An example of a Requisition Approval Task APPMAIL generated and sent by the APPMAIL ENGINE according to steps APR2,APR3 is illustrated in FIG. 4. The APPMAIL (AM1) comprises an e-mail header EH including "From" "To" "Cc" and "Subject" fields and also includes a message body MB. The header is conventional except that the APPMAIL ENGINE, in step APR2, generates the APPMAIL (AM1) to include a spoofed "From" field so that APPMAIL (AM1) appears to have been sent directly from the user SU who created and saved the proposed requisition rather than from the APPMAIL ENGINE. The general process of "spoofing" e-mail (but not as part of a system/process described herein) is well known and not explained further herein. The message body MB of the APPMAIL (AM1) comprises a first portion MB1 that includes one or more output fields including data that describe the proposed requisition according to the information entered by the user SU during the step PR2. The message body MB further comprises a structured input portion MB2 comprising one or more structured input fields MB2$f$ such as radio buttons, pull-down menus or the like that allow the recipient of the APPMAIL (AM1) to select one or more predefined structured input responses that are relevant to the collaboration effort. The APPMAIL (AM1) preferably also comprises a third portion MB3 for input of unstructured text or other data by the recipient.

With reference again to FIGS. 3A–3C, in a step APR4, the approver members of the requisition team receive and open the APPMAIL (AM1) and believe they have received an e-mail directly from the user SU that created the proposed requisition according to the process PR due to the spoofing of the "From" field of the header EH. In a step APR5, the approver members read the first portion MB1 of the message body that describes the proposed requisition and then input a structured response to the second portion MB2 of the message body (by selecting a radio button in the illustrated example) and, optionally, enters an unstructured response data in the third, unstructured input portion MB3 of the message body. After the approver team member has entered all desired structured and/or unstructured input to the fields MB2,MB3, the APPMAIL (AM1) is referred to herein as a "completed" APPMAIL.

The APPMAIL (AM1) also comprises a send field SF such as that labeled "Send Now" in FIG. 4, and in a step APR6, the approver member selects the send filed SF to send the completed APPMAIL (AM1) to the server S and APPMAIL ENGINE. Again, because of the spoofed "From" field in the APPMAIL header EH, the approver member believes he/she is responding directly to the user SU that created the proposed requisition according to the step PR.

In a step APR7, the APPMAIL ENGINE receives the completed APPMAIL (AM1) and extracts the structured and unstructured (if any) response data from the fields MB2, MB3. In a step APR8, the APPMAIL ENGINE saves the extracted response data to a requisition database utilized by the basic application. This, then, allows for the extracted structured response data to be easily processed according to standard database processing methods for any desired purpose such as reviewing the data, searching the data, generating reports/statistics based upon the data, inputting the data to another application, etc. In a step APR9, an authorized user SU logs in to the server S (if not already logged in) and accesses the requisition database to review all of the extracted response data in any desired report format known in database processing (the extracted unstructured data can simply be displayed for review by the user SU). The user SU approves the proposed requisition in a step APR10 if he/she believes the extracted response data indicates that the one or more approver members of the requisition team have approved the proposed requisition.

With the foregoing example in mind, those of ordinary skill in the art will recognize that when the APPMAIL (AM1) is sent to an e-mail user EU and when the e-mail user EU sends a completed APPMAIL (including structured and optional unstructured response data) back to the APPMAIL ENGINE (thinking that he/she has sent the completed APPMAIL back to the person listed in the "From" field of the header EH), the e-mail user has collaborated through the basic application with the user SU that generated the proposed requisition without ever directly using the basic application. The structured and unstructured response data extracted from the completed APPMAIL by the APPMAIL ENGINE is input to the basic application just as if the e-mail user EU that completed the APPMAIL directly accessed the basic application.

Figure 5:
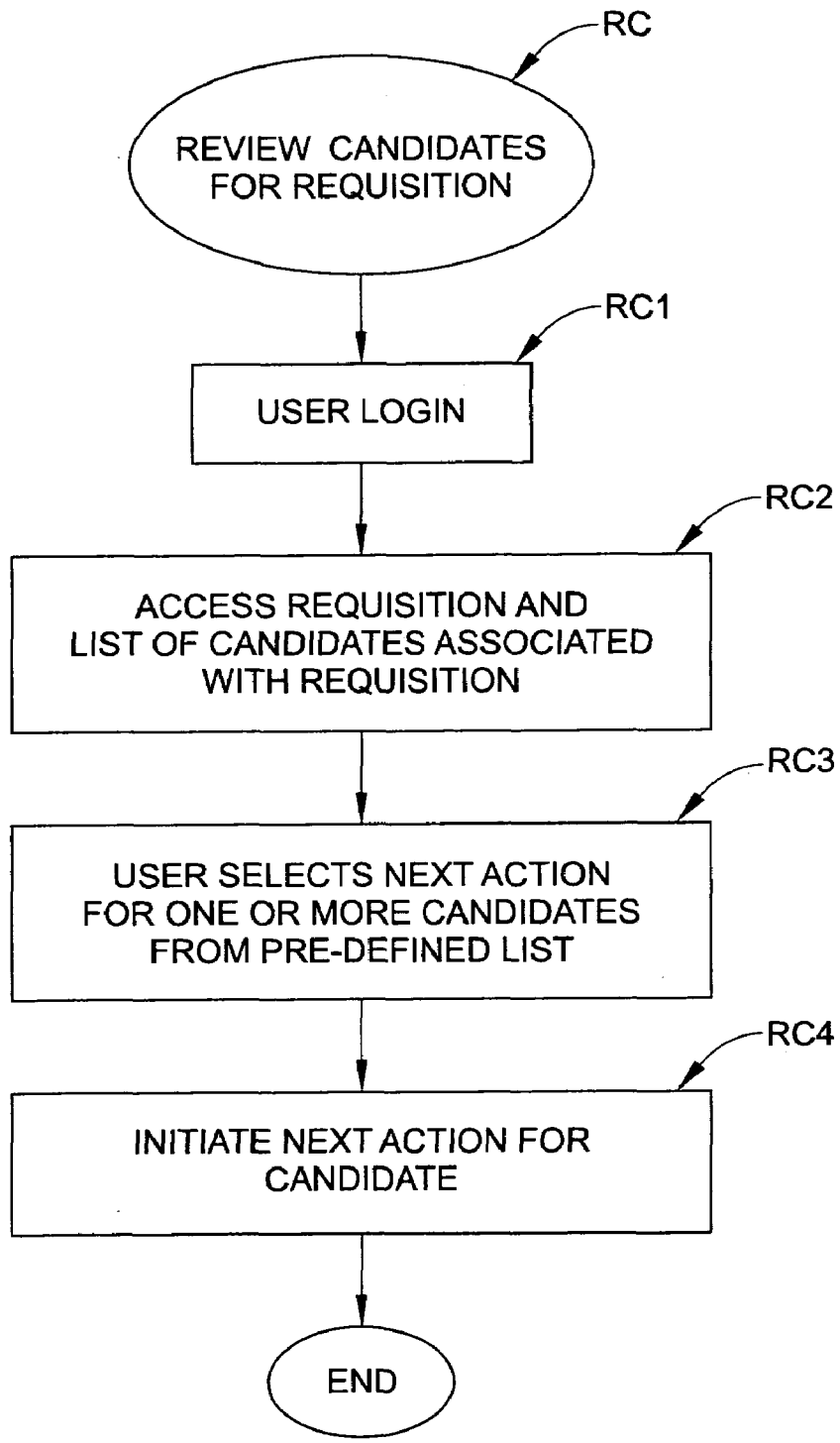
FIG. 5 is a flow chart that illustrates a review candidate for requisition process implemented in accordance with the present invention.

In another example, FIG. 5 illustrates a review candidate process RC in accordance with the present invention. The process comprises a first step RC1 where a user SU logs in to the server S and basic application running thereon. In a step RC2, the user SU opens a particular requisition from the requisition database and reviews a list of candidates that have been associated with (proposed for potentially filling) a particular requisition. In a step RC3, the user SU selects one of a plurality of predefined "next-actions" to be carried out with respect to a candidate selected from the list of candidates associated with the particular selected requisition. Examples of the predefined next-actions include: candidate review, interview, make offer. The APPMAIL ENGINE is configured with predefined rules for performing select steps for each of these predefined next-actions as described below. In a step RC4 the user SU initiates the selected predefined next-action. Here, again, the user SU interacts with the server S and basic application via conventional web browser and graphical user interface.

Figure 6A:
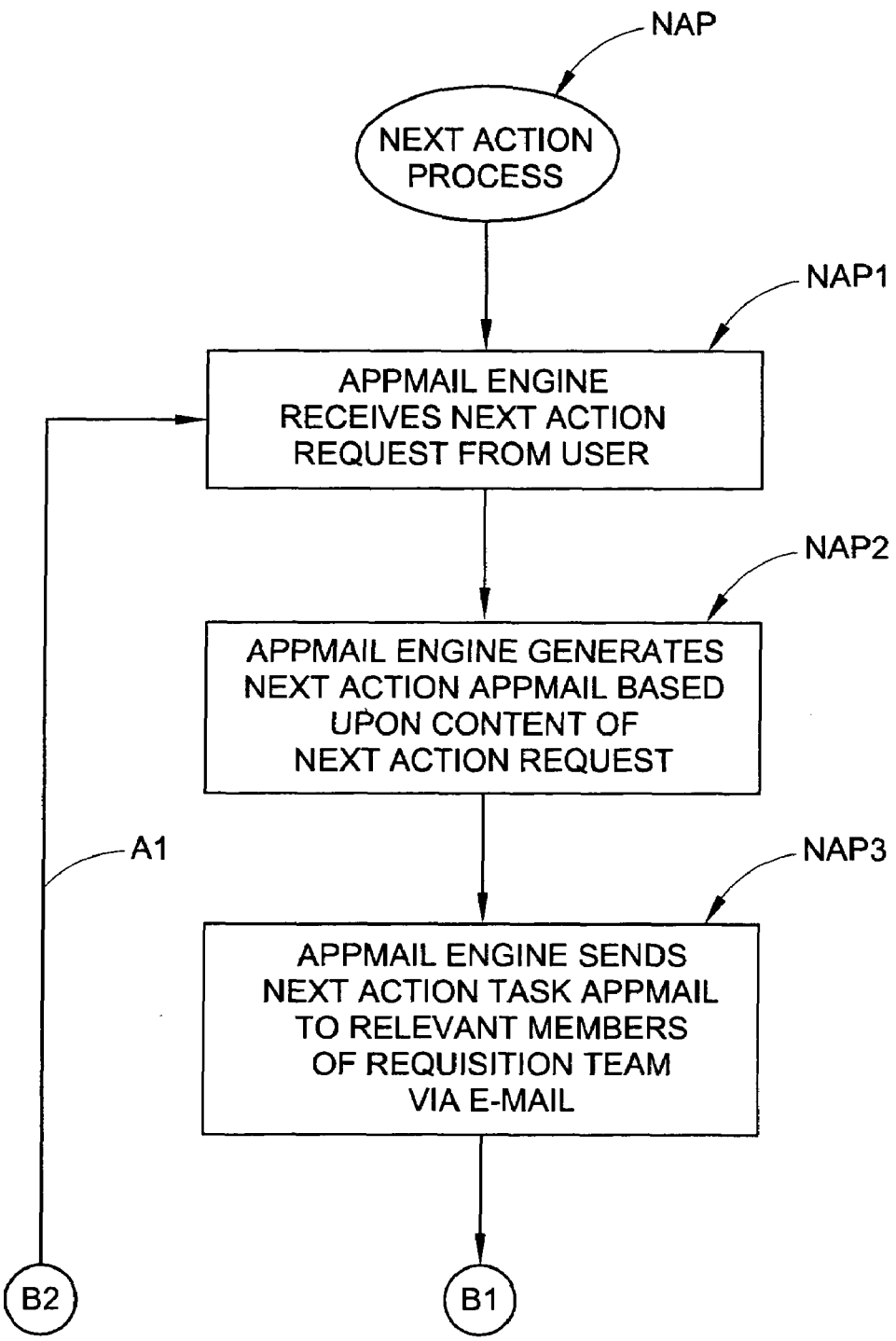
FIGS. 6A, 6B and 6C, referred to collectively as FIG. 6, define a flow chart that illustrates a candidate next action process implemented in accordance with the present invention.
Figure 6B:
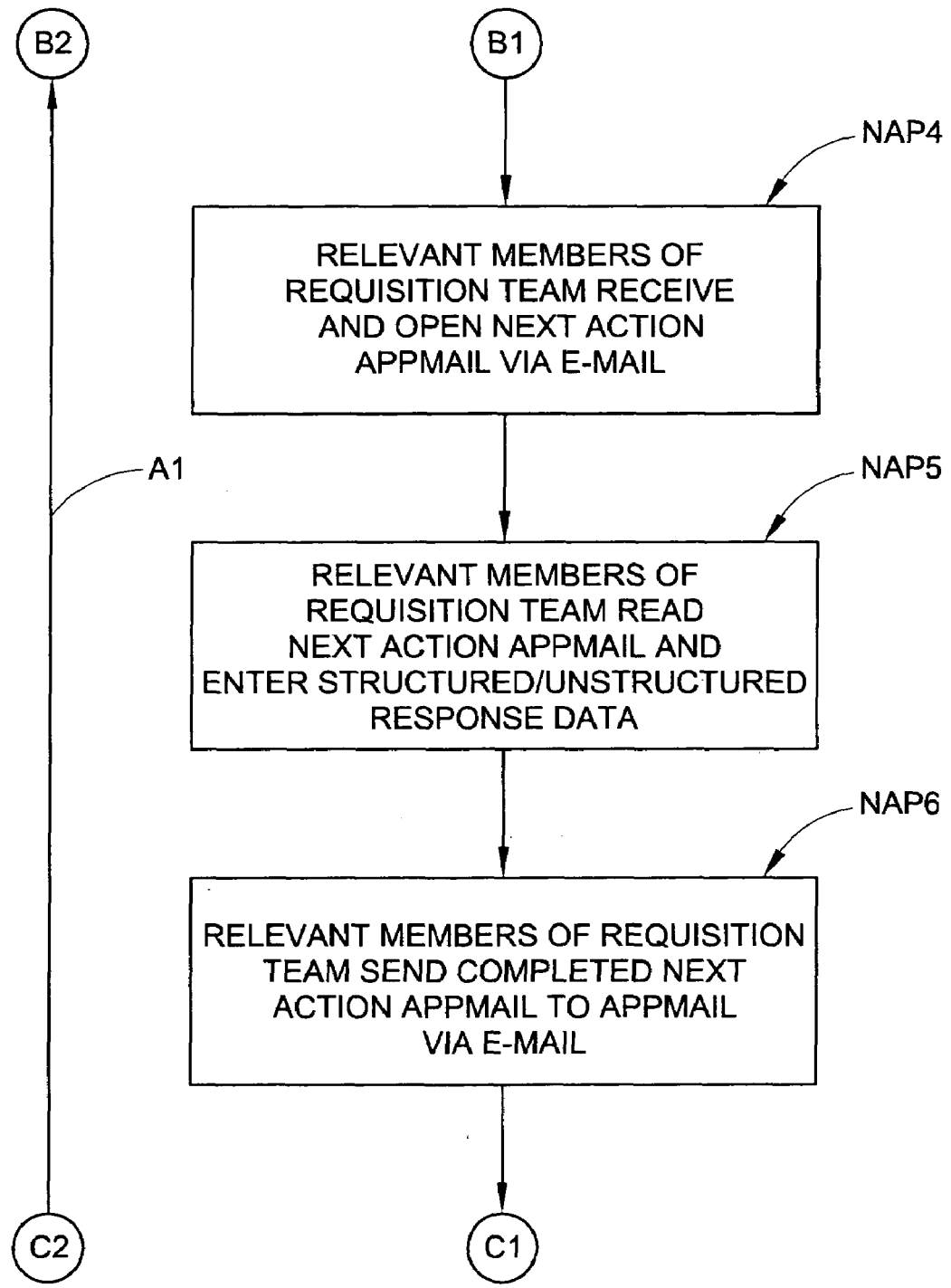
Figure 6C:
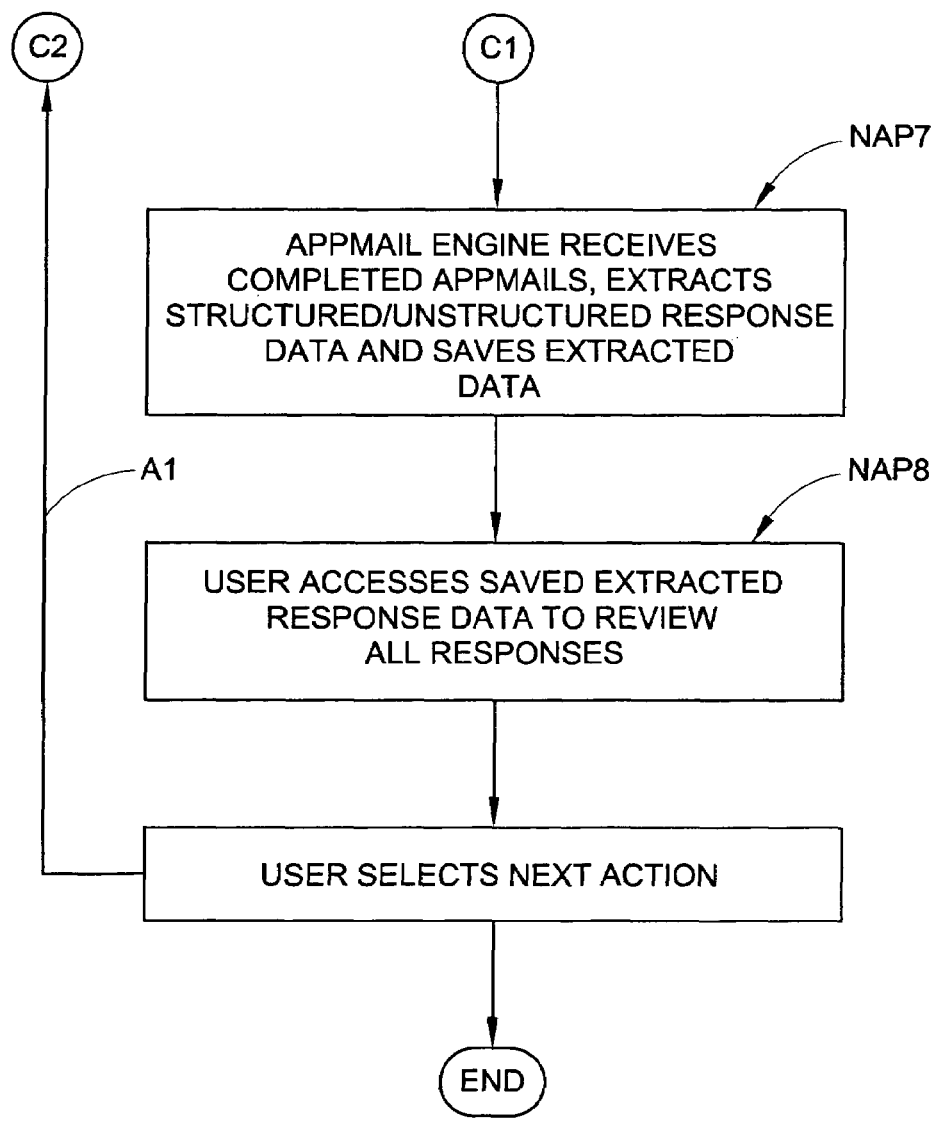

After the step RC4, the next-action process NAP of FIGS. 6A–6C is carried out. In particular, in a step NAP1, the APPMAIL ENGINE receives the next-action request initiated by the user SU according to the process RC just described (for purposes of our example, we will presume that the user SU has initiated an next-action of "review candidate"). In a step NAP2 the APPMAIL ENGINE generates a next-action APPMAIL according to the definition of the selected requisition and according to the predefined APPMAIL template for the selected "review candidate" next-action. For example, with reference to FIG. 7, the APPMAIL (AM2) is generated from a template by the APPMAIL ENGINE inserting: (i) the name of the initiating user SU in a template field AM2$a$, the name of the candidate in a template field AM2$b$; (ii) the formal name of the requisition in a field AM2$c$; (iii) a note description in a filed AM2$d$ that provides a simplified internal explanation of the requisition according to a description also previously entered by a user SU as part of the process for generating a proposed requisition. Based upon the predefined rules/template for the "review candidate" next action, the APPMAIL ENGINE attaches the resume RS of the candidate being reviewed to the newly created APPMAIL (AM2). All other aspects of the "review candidate" APPMAIL (AM2) are always identical and are stored as a default "review candidate" APPMAIL template or rule set. For example, the second (structured input) and third (unstructured input) portions MB2,MB3 of the message body MB do not change from candidate to candidate for all occurrences of the "review candidate" next action.

In a step NAP3, the APPMAIL ENGINE sends the next-action APPMAIL via e-mail to the relevant members of the requisition team for the selected requisition. The relevant members of the requisition team are those members of the selected requisition team that have been given "resume reviewer" roles, because that is the "next-action" being implemented by the APPMAIL ENGINE.

With reference again to FIG. 7, the next-action APPMAIL (AM2) is shown in FIG. 7. The next-action "review candidate" APPMAIL (AM2) comprises a header EH as described above with a spoofed "From" field showing the user SU that initiated the next-action in step RC5. The next-action APPMAIL APM2 also comprises the message body MB as described above with a first portion MB1 including data describing the next-action, a second portion MB2 configured to receive structured input, and a third portion MB3 configured to receive text and/or other unstructured input. The next-action APPMAIL (AM2) further comprises an attachment of a resume file RS for the relevant candidate for which the next-action has been requested. The APPMAIL (AM2) is referred to as a "completed" APPMAIL when the recipient has entered selected the desired structured input response and entered any desired unstructured response in the second and third portions MB2,MB3 of the message body MB. The next-action APPMAIL (AM2) also comprises a send field SF (labeled "Send Now" in the illustrated example) by which the recipient of the APPMAIL (AM2) can send the completed APPMAIL back to the APPMAIL ENGINE (while believing that he/she is sending the completed APPMAIL (AM2) to the person listed in the "From:" field of the header EH).

In a step NAP4, the relevant members of the requisition team receive and open the APPMAIL (AM2) and, in a step NAP5, the relevant members of the requisition team review the first message body portion MB1, review the attached resume or other data, enter structured response input data in the second portion MB2 of the message body and, optionally, enter unstructured response input data in the third portion MB3. In a step NAP6, the recipients of the next-action APPMAIL (AM2) select the send field SF to send the completed APPMAIL (AM2) to the APPMAIL ENGINE via e-mail.

In a step NAP7, the APPMAIL engine receives the completed APPMAIL (AM2), extracts both the structured and unstructured response data therefrom, and saves the extracted structured and unstructured response data (if any) to a database of server S.

In a step NAP8, the user SU logs in to the server S and basic application running thereon and accesses the relevant database to review all of the structured and unstructured response data extracted from the completed next-action APPMAILs (AM2) received by the APPMAIL ENGINE. As indicated by the arrow A1, for each candidate associated with the subject requisition, the user SU can select another "next-action" so that control returns to the step NAP1.

Those of ordinary skill in the art will realize from the foregoing that the use of APPMAILs, such as the APPMAILs (AM1, AM2), allow a mere e-mail user EU to receive output from and provide structured input to a basic software application running on a server S, even where the e-mail users cannot directly access the server S and basic software application running thereon. The APPMAILs (AM1,AM2) described and illustrated herein are merely examples, and numerous other APPMAILs can be generated in accordance with the present invention.

Figure 8:
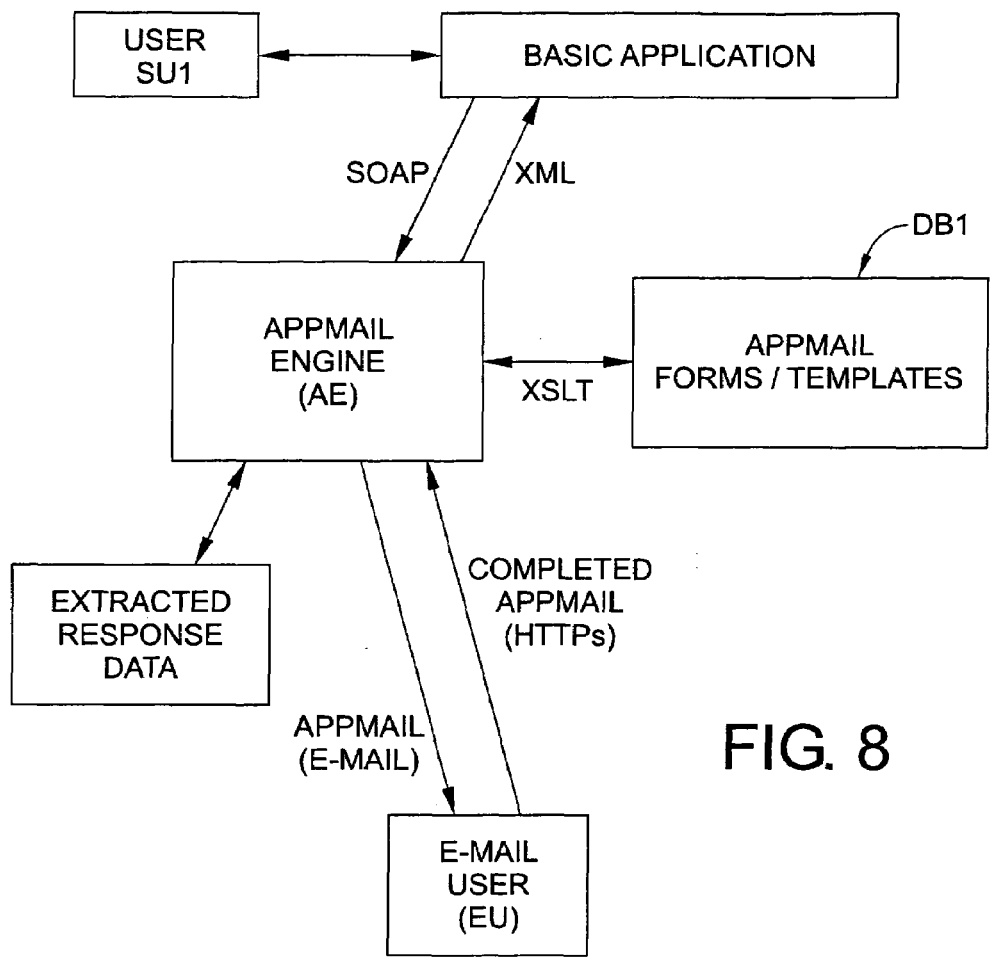
FIG. 8 is a diagram that generally illustrates the process of generating and using an APPMAIL in accordance with the present invention.

FIG. 8 is a diagram that generally illustrates the process of generating and using an APPMAIL in accordance with the present invention. The APPMAIL ENGINE (AE) receives a request for an APPMAIL from a user SU1 via HTML, XML, or the like. Alternatively, the request for an APPMAIL is automatically generated by an external process (see the example described above in connection with the "Approve Proposed Requisition" process APR wherein the APPMAIL is automatically requested when the user saves a proposed requisition). In either case, the request for an APPMAIL includes all required data to be inserted into a predefined APPMAIL template or used by predefined APPMAIL rules. The APPMAIL ENGINE access a database DB1 or other storage means to retrieve the predefined APPMAIL template/rules. The APPMAIL ENGINE then prepares the requested APPMAIL by combining the user-supplied data with the predefined template/rules. The APPMAIL ENGINE also spoofs the "From" field of the APPMAIL so that the APPMAIL will appear to a recipient to have been sent by the user SU1. The APPMAIL ENGINE then sends the APPMAIL to all relevant e-mail users EU. The e-mail users EU who receive the APPMAIL will open same via browser, e-mail program, etc. and will provide the requested structured and unstructured response data based upon the content of the APPMAIL. The completed APPMAIL is then sent from the user EU to the APPMAIL ENGINE via http(s) or other secure means. Finally, the APPMAIL ENGINE extracts the structured and unstructured response data and stores same in a database DB2 for review use by the user SU1, as input to the underlying basic application, to generate reports and/or statistics or simply as a permanent record of activity. In this example, the user SU1 receives this information from the APPMAIL ENGINE as XML data.

Figure 7:
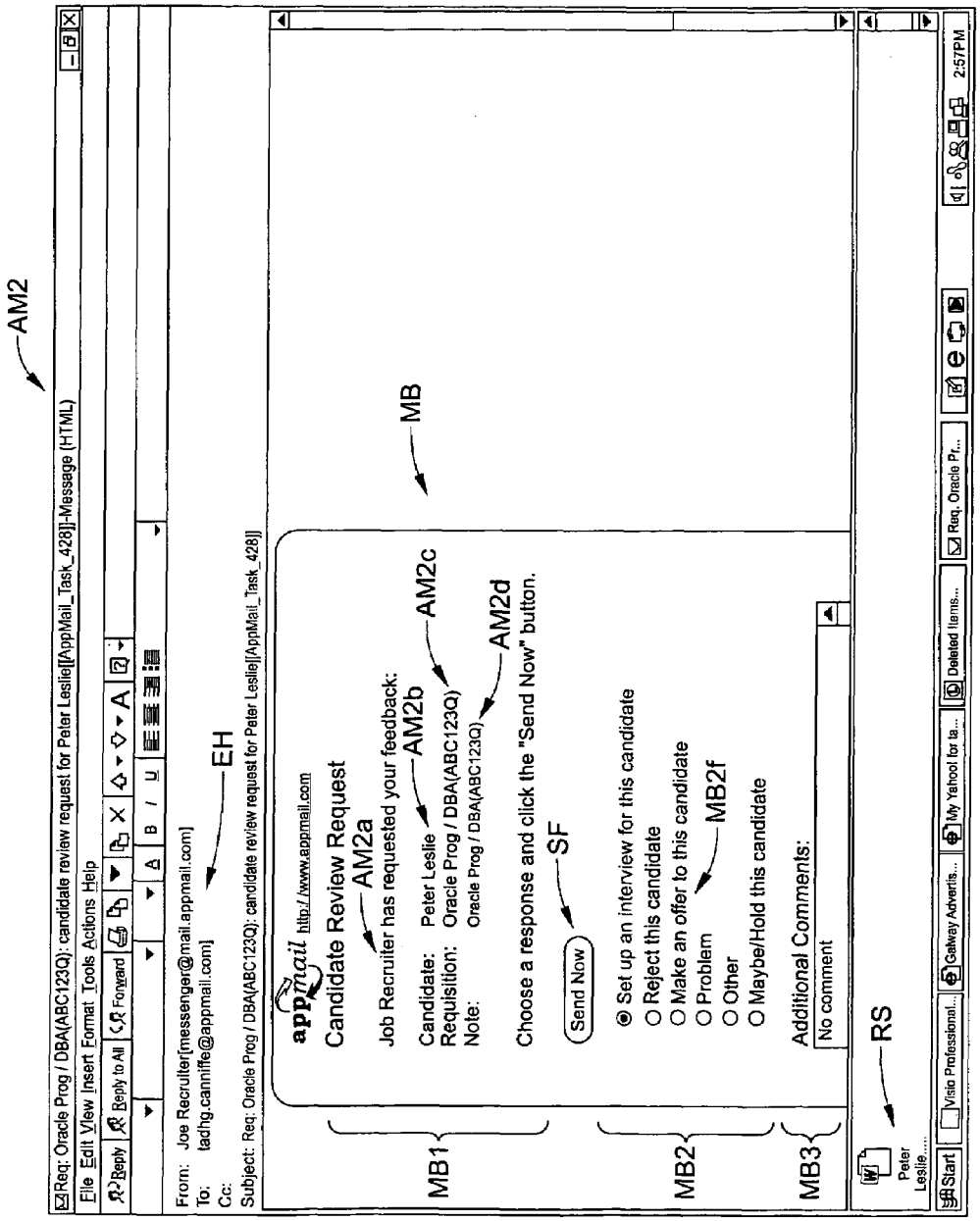
FIG. 7 illustrates an APPMAIL generated in accordance with process of FIG. 6 whereby a user received output from and provides both structured and unstructured input to a basic computer software application in accordance with the present invention.

The end result of the APPMAIL ENGINE (AE), as described above, is an APPMAIL (AM1,AM2) request sent to users of the system via e-mail as shown, e.g., in FIGS. 4 and 7. The APPMAIL (AM1,AM2) is received by a user EU via an e-mail client and appears in the user's inbox just like any other e-mail. Because the APPMAIL contains form objects such as radio buttons etc. the response will be able to be captured by a back end application in a structured way. Also because the APPMAIL ENGINE (AE) knows the user originating the request the APPMAIL can be sent as that person via spoofing. The recipient user EU of the APPMAIL will not know that it is system generated and will be more likely to respond.

In one preferred embodiment, the APPMAIL ENGINE (AE) stores the APPMAIL forms/templates as XSLT based data. The APPMAIL ENGINE receives a request for an APPMAIL from a user via the underlying basic application in the form of a SOAP message that contains a transaction which includes one or more APPMAIL requests. Each APPMAIL request is a set of XML data defined by the requesting user using the underlying basic application program. The SOAP message includes additional data to define the desired APPMAIL transaction such as a due date for responses from recipients of the APPMAIL, the definition of a valid response (e.g., whether an incomplete response is valid), the percentage of valid responses required, and other parameters such as what action to take (e.g., re-send, none) in the event an invalid completed APPMAIL is received. The SOAP message defining the requested APPMAIL transaction further preferably includes re-send instructions defined by the requesting user that indicate when an APPMAIL should be re-sent by the APPMAIL ENGINE to a recipient (and how many re-send attempts are to be made) upon a recipient's failure to respond to the original APPMAIL. The APPMAIL ENGINE logs the overall transaction and all requests included therein in a database.

Each XML request defined as part of the SOAP message received by the APPMAIL ENGINE (AE) is then translated into the APPMAIL by the APPMAIL ENGINE. More particularly, the APPMAIL ENGINE integrates the XML request data from the SOAP message with the appropriate XSLT-based APPMAIL form/template that was previously stored by the APPMAIL ENGINE. The APPMAIL is preferably defined as an MHTML (or HTML) email, and the APPMAIL ENGINE sends the APPMAIL to the designated recipients via e-mail.

As described above, the recipients of the APPMAIL such as e-mail users EU complete the APPMAIL and return the completed APPMAIL to the APPMAIL ENGINE via http/https to an awaiting servlet. The APPMAIL ENGINE (AE) receives the completed APPMAIL and re-constitutes same into XML. The XML data representing structured and unstructured response data entered by the recipient of the APPMAIL and other associated data are stored in a database and logged against the relevant request from which the APPMAIL was generated.

When the APPMAIL ENGINE determines that an APPMAIL transaction is complete and/or when the an authorized user accesses the APPMAIL ENGINE to request the structured/unstructured response data and associated data, the APPMAIL ENGINE (AE) generates a SOAP message containing the response data and all other associated data and send same to the requesting user. The APPMAIL ENGINE can receive various requests from users such as a request for transaction data, a request for transaction status, a request for unresponsive recipients of the APPMAIL, and the like.

Referring now to FIG. 9, the system and method of the present invention are described further. Those of ordinary skill in the art will recognize from the foregoing that the APPMAIL ENGINE (AE) allows for data required by an underlying basic computer software application to be requested from a number of different people through e-mail and collected together in a structured way. The APPMAIL ENGINE (AE) can link in or be embedded into other systems to increase functionality. For example, for underlying basic computer software applications where the APPMAIL ENGINE (AE) is not an integral part thereof, a custom request broker CRB is used to provide an interface between other third-party underlying basic applications and the APPMAIL ENGINE (AE) (see FIG. 9). The custom request broker CRB translates data from the third-party underlying basic application into the required format for input to the APPMAIL ENGINE (e.g. a SOAP message) and also translates output from the APPMAIL ENGINE into the required format for use by the third-party basic application. The custom request broker CRB interfaces directly with the APPMAIL ENGINE (AE) in the manner described above in relation to FIG. 8.

As shown in FIG. 9, the custom request broker CRB receives a request for an APPMAIL from a user SU1 of the basic application. The basic application sends the APPMAIL request and all associated data to the custom request broker CRB which, in turn, derives the required SOAP message defining the APPMAIL request. The SOAP message is sent to the APPMAIL ENGINE (AE) and, more particularly, to an APPMAIL GENERATOR portion thereof. The APPMAIL GENERATOR receives the relevant APPMAIL form and populates same to define the requested APPMAIL using the data defined in the SOAP message and the XSLT data defining the APPMAIL form.

The APPMAIL ENGINE (AE) then sends the APPMAIL to the designated recipients via e-mail. The user completes the APPMAIL and returns same to the APPMAIL ENGINE via http(s). An APPMAIL PARSER portion of the APPMAIL ENGINE receives the completed APPMAIL and extracts the structured and unstructured response data therefrom for entry into a results database. The contents of the results database are available to the basic application via the custom request broker CRB.

It can be seen from the foregoing that the system and method provided in accordance with the present invention allow for a collaboration effort via an underlying basic application. The system allows for prompting for, collection of, logging and tracking of, and auditing requests and responses (or lack of responses). The system provides a means for managing and escalating events by automatically generating new or follow-up APPMAILS in response to incomplete or absent responses. The system also provides a means for email threading and event driven transactions as described above.

It is noted that the APPMAIL templates can be predefined or custom-defined by users of the underlying basic application. A user defining a custom APPMAIL template can execute the template in a test mode to himself or herself to determine if the resulting APPMAIL is structured as desired.

The invention has been described with reference to preferred embodiments. Modifications to the invention will occur to those of ordinary skill in the art upon reading this specification. It is intended that the appended claims be construed as including all such modifications and alterations.

Having thus described the preferred embodiments, what is claimed is:

1. A method for interacting with an underlying computer software application using e-mail, said method comprising:

receiving an APPMAIL request initiated by said underlying computer software application in response to control of said underlying computer software application by a standard user, said APPMAIL request defining a task requiring input to the underlying computer software application from at least one e-mail user recipient that cannot directly access said underlying software application;

generating an APPMAIL based upon said APPMAIL request, said APPMAIL including a body providing information concerning said task and at least a structured input portion, said structured input portion including at least one structured input field for receiving pre-defined structured input from said at least one recipient;

sending said APPMAIL to said at least one e-mail user recipient via e-mail;

receiving a completed APPMAIL from said at least one e-mail user recipient, said completed APPMAIL comprising structured input data entered by said at least one e-mail user recipient in said at least one structured input field;

extracting said structured input data from said completed APPMAIL;

storing said extracted structured input data for input to and use by said underlying computer software application, wherein said at least one e-mail user recipient does not have direct access to or control of said underlying computer software application;

inputting said extracted structured input data to said underlying basic computer software application;

using said underlying software application to generate a report that summarizes said structured input data extracted from said completed APPMAIL received from said at least one e-mail user recipient.

2. The method as set forth in claim 1, wherein said step of receiving an APPMAIL request comprises receiving a SOAP transaction message comprising APPMAIL data defining said task.

3. The method as set forth in claim 2, wherein said step of generating an APPMAIL comprises populating a pre-defined APPMAIL template based upon said APPMAIL data of said SOAP message.

4. The method as set forth in claim 3, wherein said predefined APPMAIL template is defined by XSLT data.

5. The method as set forth in claim 1, wherein said APPMAIL further comprises an unstructured input portion including at least one unstructured input field for receiving unstructured input data from said at least one recipient, and wherein said completed APPMAIL further comprises unstructured input data.

6. The method as set forth in claim 5, further comprising:
extracting unstructured input data from said completed APPMAIL; and,
storing the extracted unstructured input data.

7. The method as set forth in claim 1, wherein the step of sending said APPMAIL further comprises spoofing said APPMAIL so that said APPMAIL appears to have been generated and sent by said standard user.

8. The method as set forth in claim 1, wherein said step of receiving a completed APPMAIL further comprises:
determining if said completed APPMAIL is a valid completed APPMAIL.

9. The method as set forth in claim 8, further comprising:
rejecting said completed APPMAIL if said completed APPMAIL is invalid.

10. The method as set forth in claim 1, wherein said step of sending said APPMAIL comprises sending said APPMAIL to multiple e-mail user recipients via e-mail, said method further comprising:
determining how many completed APPMAILS have been received from said multiple e-mail user recipients.

11. The method as set forth in claim 1, wherein said step of sending said APPMAIL comprises sending said APPMAIL to multiple e-mail user recipients via e-mail, said method further comprising:
determining non-responsive ones of said multiple e-mail user recipients from which a completed APPMAIL has not been received; and,
sending a reminder message via e-mail to said non-responsive ones of said multiple e-mail user recipients.

12. The method as set forth in claim 1, further comprising:
using said extracted structured input data to generate a second APPMAIL request, said second APPMAIL request defining a second task requiring input to the underlying computer software application, said method further comprising:
generating a second APPMAIL based upon said second APPMAIL request, said second APPMAIL including a body providing information concerning said second task and at least a structured input portion, said structured input portion including at least one structured input field for receiving pre-defined structured input from at least one e-mail user recipient of said second APPMAIL;
sending said second APPMAIL to said at least one e-mail user recipient of said second APPMAIL via e-mail;
receiving a completed second APPMAIL from said at least one e-mail user recipient of said second APPMAIL, said completed second APPMAIL comprising structured input data entered by said at least one e-mail user recipient of said second APPMAIL in said at least one structured input field;
extracting said structured input data from said completed second APPMAIL; and,
storing said extracted structured input data for use by said underlying computer software application.

13. The method as set forth in claim 1, wherein said step of receiving an APPMAIL request associated with said underlying computer software application comprises receiving an APPMAIL request via a custom request broker interfaced to each of said underlying computer software application and an APPMAIL engine which receives said APPMAIL request.

14. A method for collaborating among a plurality of users, said method comprising:
receiving by an APPMAIL ENGINE an APPMAIL request associated with an underlying computer software application, said request defining a task requiring input to the underlying computer software application from a plurality of e-mail only users, wherein said APPMAIL request is initiated by a standard user with access to and control of an underlying software application;
generating an APPMAIL by said APPMAIL ENGINE based upon said APPMAIL request, said APPMAIL including a body providing information concerning said task and at least a structured input portion, said structured input portion including at least one structured input field for receiving pre-defined structured input from said plurality of e-mail only users;
sending said APPMAIL to said plurality of e-mail only users via e-mail;
receiving a completed APPMAIL from at least one of said e-mail only users, said completed APPMAIL comprising structured input data entered by said at least one e-mail only user in said at least one structured input field;
extracting said structured input data from said completed APPMAIL; and,
storing said extracted structured input data, said structured input data to be used by said underlying software application for at least one of:
reviewing by said standard user;
inputting to said underlying computer software application;
generating reports or statistics', and
serving as a permanent record of collaboration activity.

15. The method as set forth in claim 14, wherein said responding one of said users cannot directly access said underlying computer software application.

16. The method as set forth in claim 14, wherein said step of receiving by an APPMAIL engine an APPMAIL request comprises receiving an APPMAIL request from one of said users or an automated process.

17. The method as set forth in claim 14, wherein said step of receiving by an APPMAIL engine an APPMAIL request comprises receiving an APPMAIL request via said underlying computer software application.

18. The method as set forth in claim 14, wherein said step of receiving by an APPMAIL engine an APPMAIL request comprises receiving an APPMAIL request via a custom request broker interfaced to each of said underlying computer software application and said APPMAIL engine.

* * * * *